H. F. LÖWENSTEIN.
CHANGEABLE PICTURE DEVICE.
APPLICATION FILED OCT. 16, 1914.

1,285,753. Patented Nov. 26, 1918.

UNITED STATES PATENT OFFICE.

HARRY F. LÖWENSTEIN, OF WASHINGTON, DISTRICT OF COLUMBIA.

CHANGEABLE-PICTURE DEVICE.

1,285,753.  Specification of Letters Patent.  Patented Nov. 26, 1918.

Application filed October 16, 1914.  Serial No. 866,941.

*To all whom it may concern:*

Be it known that I, HARRY F. LÖWENSTEIN, a citizen of the United States, residing at Washington, in the District of Columbia, have invented certain new and useful Improvements in Changeable-Picture Devices, of which the following is a specification.

This invention relates to optics and more particularly to color screens for selectively segregating or viewing different overlapping pictures, for the purpose of producing a cinematographic effect, such as disclosed in the United States patent to Andre David, No. 174,106, issued February 29, 1876.

In the patent above referred to, two pictures in complementary colors, each representing a different phase of movement of an object, are overlapped on a common field and movement thereof is simulated by alternate segregation of the different pictures through a suitable viewing screen in rapid succession. The viewing screen is there shown in the form of a paddle having a handle at one end with the body of the paddle formed of two complementarily colored screens juxtaposed on a line transverse of the paddle. With a viewing screen having such an arrangement of parts, it is necessary, in operation, to move it horizontally across the eyes of the observer with the line of juxtaposition of the two complementary screens positioned vertically and passing first one eye and then the other which produces a confused image during the time the line is between the eyes, and requires a movement equal at least to the distance between the eyes which prohibits rapid operation.

The object of the present invention is to obviate the above mentioned defects by providing a viewing screen adapted to be easily operated by hand to effect an interchanging of the complementary screens simultaneously before both eyes and with a minimum amount of movement, whereby a complete change of view is produced instantaneously, and rapid operation rendered possible with little energy.

Figure 1:
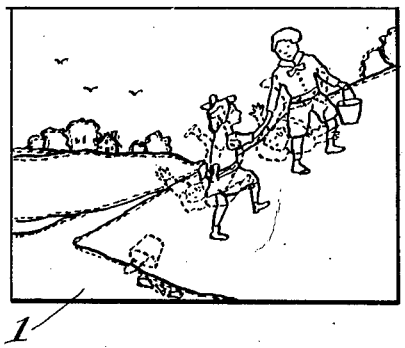
Figure 1 is a view of a composite picture as viewed by the unaided eye.

Referring to the drawings in particular, in Fig. 1, 1 represents the surface of a card, a page of a book or other similar object on which are two monochrome pictures in complementary colors, for example, one in red and the other in green. The red picture is indicated in solid lines while the green picture is indicated in dotted lines. The pictures may or may not overlap, and where they overlap the overlapping colors should combine to form black or a very dark color substantially black. To this end, the outside picture at least, should be in a transparent color medium so as to reflect very little or no light and act as a color screen to screen off the light reflected from the underlying color medium and thus produce in effect a dark or substantially black color at the overlapping areas.

Figure 2:
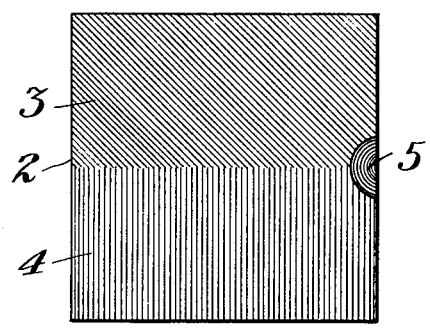
Fig. 2 is a view of a double color or viewing screen.

In Fig. 2, a double viewing screen 2 is shown which consists of a transparent body, preferably a light flexible body such as sheet gelatin or celluloid. One portion of the screen such as 3 is colored so as to transmit substantially the same amount and kind of light from both the light surface on which the composite picture is printed, and from one of the monochromes, while holding back that of the other monochrome, and another portion of the screen such as 4 is colored so as to have the opposite effect. For example in this case, the portion 3 is colored green and the portion 4 colored red as indicated. To facilitate handling, the screen 2 may be provided with a suitable holder such as the finger hold 5 which in the form shown may be a simple fold of leather or the like attached at the middle of one edge of the screen.

Figure 3:
Fig. 3 is a view of the composite picture as seen through one of the color screens.
Figure 4:
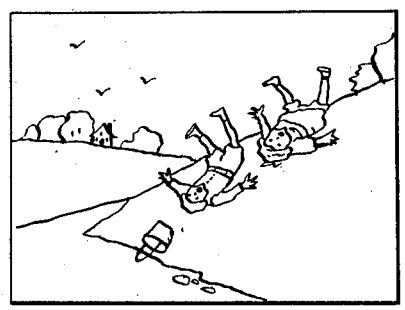
Fig. 4 is a view of the same picture as seen through the other color screen.

In the example here shown, the operation is as follows:

The observer first views the composite picture of Fig. 1 through the green portion 3 of the screen 2 whereupon the contrast between the green monochrome (see dotted lines Fig. 1) and the back ground is substantially destroyed and that between the red monochrome (see solid lines Fig. 1) and the back ground is increased so that the picture appears as shown in Fig. 3. The observer then moves the screen upwardly and views the composite picture through the green portion 4 whereupon the effect is reversed and the picture appears as shown in Fig. 4.

Figure 5:
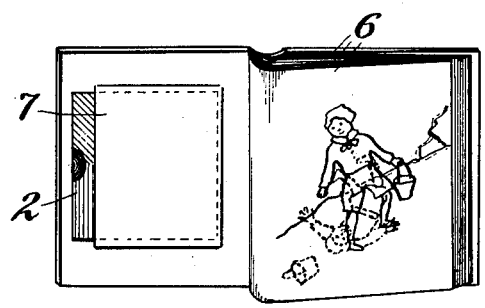
Fig. 5 is an embodiment of the invention in the form of a toy book.

A convenient embodiment of the invention is that of a book as shown in Fig. 5 wherein the composite pictures are printed on the pages 6 and the color screen 2 carried in a pocket 7 on one of the covers.

Having thus described my invention, what I claim and desire to secure by Letters Patent is:

1. A changeable picture device comprising in combination, a composite picture consisting of two monochromes each of a color complementary to the other, and a transparency through which to view said picture having complementarily colored portions and arranged when held before the eyes and moved vertically, to alternately interpose said colored portions between the picture and both eyes simultaneously.

2. As a new article of manufacture, a hand operated color screen consisting of a transparency having two differently colored oblong portions juxtaposed along one of the long edges of each on a substantially straight line, together with a holder therefor, said constituent elements being so proportioned and arranged in relation to each other that when the screen is held in the hand by said holder the line of juxtaposition will become an extension of the hand holding the screen, whereby when the screen is held before the eyes the said line of juxtaposition may be readily passed simultaneously across both eyes of the observer.

In testimony whereof I affix my signature in presence of two witnesses.

HARRY F. LÖWENSTEIN.

Witnesses:
JAMES H. MARR,
K. C. KING.